United States Patent [19]

Landsdorff

[11] Patent Number: 4,950,122

[45] Date of Patent: Aug. 21, 1990

[54] IMPROVEMENT IN MONOCOCQUE CONTAINERS

[76] Inventor: Stig-Ragnar J. Landsdorff, Lot 2 Shallow Bay Road, Coomba Bay via Pacific Palms, Pacific Palms, N.S.W. 2428, Australia

[21] Appl. No.: 279,703

[22] PCT Filed: Apr. 22, 1987

[86] PCT No.: PCT/AU87/00110

§ 371 Date: Oct. 12, 1988

§ 102(e) Date: Oct. 12, 1988

[87] PCT Pub. No.: WO87/06560

PCT Pub. Date: Nov. 5, 1987

[30] Foreign Application Priority Data

Apr. 24, 1986 [AU] Australia .............................. PH5610

[51] Int. Cl.[5] .............................................. B60P 1/00

[52] U.S. Cl. .................................. 414/512; 138/150; 138/154; 138/144; 414/513; 414/511; 414/517; 414/525.6; 414/525.3; 296/101; 100/218; 52/245

[58] Field of Search ................................ 414/509-518, 414/525.1-525.9; 296/101; 52/245; 138/144, 150, 154, 172, 130, 129, 131; 220/414, 445, 415; 244/119; 105/351, 358, 404; 100/218

[56] References Cited

U.S. PATENT DOCUMENTS 1,908,899 5/1933 Kayel .................................. 414/517
1,961,587 6/1934 Hulley et al. ........................ 414/513
3,175,586 3/1965 Tatsch ............................. 138/144 X
3,247,984 4/1966 Gregory, Sr. et al. ............. 414/513
3,318,231 5/1967 Felts ................................ 414/517 X
3,664,072 5/1972 Lieckfeld ......................... 138/154 X
4,010,864 3/1977 Pimshtein et al. .............. 138/150 X
4,013,181 3/1977 Johnson ............................. 414/512
4,509,447 4/1985 Smith, Sr. ........................ 138/150 X
4,538,951 9/1985 Yeazel et al. ................... 414/513 X

FOREIGN PATENT DOCUMENTS 13340 1/1935 Australia .
162015 4/1954 Australia .
50727 7/1974 Australia .
55884 11/1974 Australia .
82051 12/1976 Australia .
43862 8/1979 Australia .
46287 11/1979 Australia .
682536 3/1964 Canada ................................ 138/130
127248 12/1984 European Pat. Off. .
220936 5/1987 European Pat. Off. ............ 414/517
140070 2/1980 German Democratic Rep. ................................ 138/154
34833 10/1971 Japan .................................. 138/150

*Primary Examiner*—Frank E. Werner
*Attorney, Agent, or Firm*—Roylance, Abrams, Berdo & Goodman

[57] ABSTRACT

A container of monococque construction having a peripheral wall comprised of concentric inner and outer walls, with the space between the walls being filled with a plastics material. At least one of the inner and outer walls is a spirally-wound tube having raised seams projecting into the space between the inner and outer walls. The container is particularly adapted to form the body of a waste compactor for use as a bulk container for both fluid and particulate materials.

15 Claims, 4 Drawing Sheets

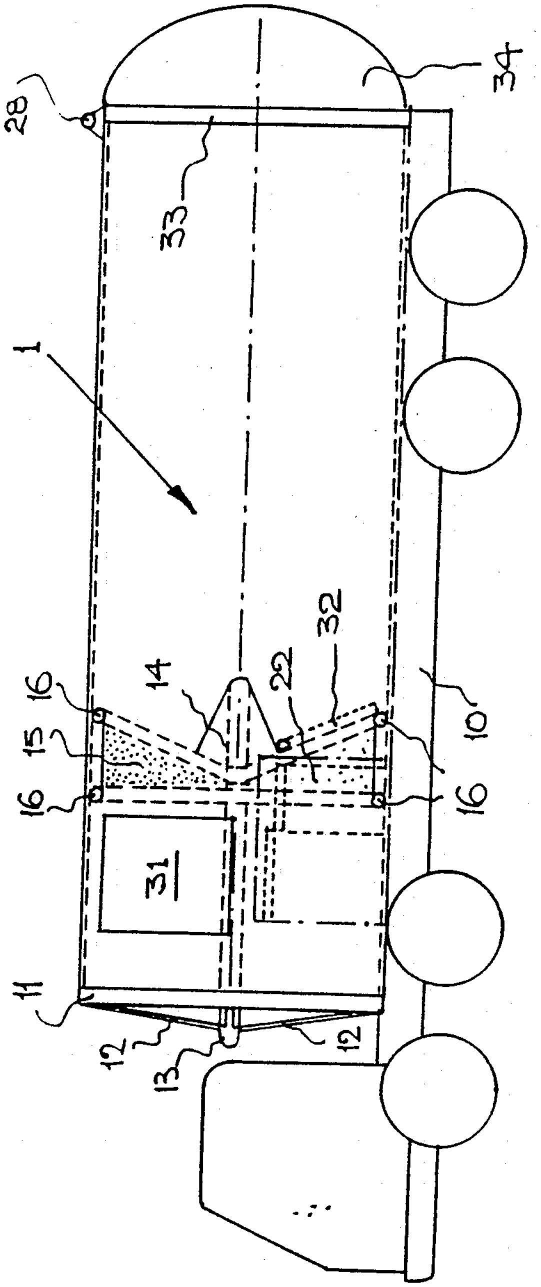
–FIG. 4–

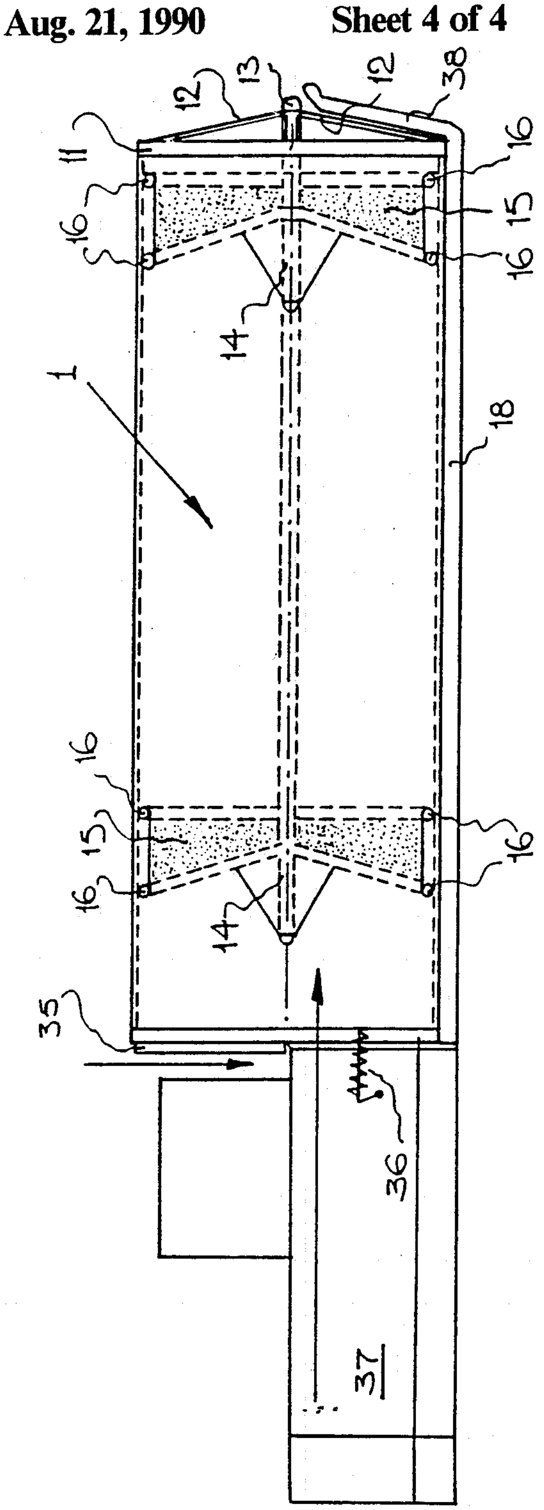
-FIG. 5-

MONOCOCQUE CONTAINERS

This invention relates to monococque container construction and to the use thereof in waste compactors, and especially to waste compactors which are mountable upon a truck chassis and which are of low tare weight, low cost, and which have a high payload whilst only emmitting noise at an acceptably low level.

The invention also has application to the collection of fluid waste and sludge in mobile tank-equipped rail or road vehicles and to the storage and transport of liquids and powdery or particulate bulk materials in tanks of monococque construction.

BACKGROUND ART

First trends to compact waste during transport appeared in 1880, when compaction was applied in horse driven waste carts.

The first known truck-mounted waste collector transporter appeared in Germany in 1912 and in the U.S.A. in 1922.

By the early 1930's there appeared in Sweden and Germany the first compacting waste trucks, using the principle of a packing screw.

In 1938 the first plate type compactor appeared in Sweden (Trelleborg).

In the early 1950's there was in France the S.C. paddle type packer (C.I.T.A.).

However, all compactors packing into a conical section proved to be unsuccessful and the plate packers took over the markets in Europe, the U.S.A., and the rest of the world.

By the late 1950's to early 1960's, the Swiss development of carriage plate/swing plate packers, with a collection body built on frames in a square section, became trendsetting for the mobile compactors of today.

The leading European mobile compactors, e.g. Ochsner, Haller, Norba, Faun, and the American Heil, Dempster, Peabody, etc all follow this principle The waste contractors asked for more economical compactors, which in Europe resulted in a trend for low wear, longer lifetime, and thus heavier machines, while in the U.S.A. the trend was for larger units, cheaper components, and a restricted economical lifespan of five years.

Both the low-wear, high-quality, costly European compactors and the large-volume, short-lifespan U.S. compactors became uneconomical in many countries when scaled down in size, or illegal when used in their original dimensions; this situation is because of lower legally permitted axle loadings in such countries.

Most waste collection devices presently in use are of box-like construction having a rectangular cross-section. A single-layer plate element is fitted inside a framework of channel-sectioned vertical and longitudinal members to provide a body interior having smooth-surfaced floor, sidewalls, and roof so enabling the inside travel of an ejection panel.

Some known waste compactors, and waste and fluid collection bodies are built with circular-, or part-circular-, cross-sections reinforced by exterior annular frame elements, but their interiors are still of a smooth, single-layer skin construction so as to permit a discoid ejection blade or panel to travel inside the "tube".

Furthermore, most waste compactors are rear loading and use a compacting unit which is rigidly mounted on a hinged tailgate and which may consist of a guided carriage plate moved substantially vertically by an hydraulic system. A swing plate is fitted to the bottom end of this carriage plate, sweeping the waste from the underlying hopper, then stopping at an angle normal to the carriage plate and travelling up with it so as to compress the waste upwardly and slightly forwardly, and into the body interior.

This conventional kind of compactor has the disadvantage of being heavy and, if as is usual, tilted 45° forward, gives an unacceptable long rear overhang together with a high rear axle loading.

Both of the abovementioned types of collection bodies have a drawback in the homogeneous metal skin fabrication which is conducive to considerable environmental noise pollution as pottery, bottles, boxes, and the like crack, break or burst inside the waste collection body.

As regards to complexity and weight problems of conventional compacting units, a construction has been proposed which has a strong blade oscillating through 180° and pushing waste from the hopper into the collection body; this proved vulnerable to jamming of the swinging blade and even to its destruction due to high inertia forces. Thererfore, it will be clear that a need exists for a waste compactor incorporating a mobile body having:

(i) better payload/vehicle total weight ratio—(this being a primary factor for improved economical performance);

(ii) lower fuel consumption;

(iii) lower servicing and maintenance cost;

(iv) possible changeability of bodies;

(v) less rear overhang - thus fully utilizing front axle load capacity;

(vi) versatility of use;

(vii) lower noise level - less noise pollution to the environment during night collection, this being safer due to decreased road traffic.

DISCLOSURE OF INVENTION

It is therefore an object of the present invention to overcome the above and other disadvantages of prior art waste compactors by the provision of a lightweight waste collector and compactor which is of relatively low cost and which has low noise emission when operating in compacting mode.

Thus, in accordance with one aspect of the present invention, there is provided a monococque structural container having a peripheral wall (1) comprised of an inner wall (2) and an outer wall (3) substantially concentrically disposed with respect to each other and separated by means of a plurality of circumferentially-spaced, longitudinally-directed stringer members (8) in the annular space (6) defined between the said inner and outer walls (2, 3), wherein said inner and outer wall (2, 3) are spirally-wound formed from strip metal and in which adjacent edges of the strip metal overlap so as to form resilient rolled helical seams (4, 5) disposed so as to project inwardly into the said annular space (6), and wherein the direction of the helical seam (4) of the inner wall (2) runs opposedly to the direction of the helical seam (5) of the outer wall (3), the said annular space (6) being filled with a plastics material (7); characterised in that the combination of the opposed, rolled helical seams (4, 5), the plastic filling layer (7), and the longitudinally-directed stringer members (8) serve to provide a geodesic structure forming a grid of polygons to thereby distribute any impact or pressure loads throughout the structure of the container.

In accordance with a further aspect of the present invention the inventive monococque container, above, is mounted on, or incorporated as part of, a rail or road vehicle, such as a rail or road tanker for bulk liquid or particulate materials.

In a preferred emodiment, the vehicle comprises a waste collection and compaction vehicle having a monococque container substantially horizontally disposed along the longitudinal axis of the vehicle and having front and rear ends, the container having a horizontally-extending (preferably telescoping) compaction piston or ram for compaction of the waste material, and an openable rear end for ejection of the compacted waste material.

Preferably the waste collection and compaction vehicle further comprises separate compaction means mounted at the rear end of the container, ideally pivotally mounted for adjustment of the load height for loading material into the compaction means.

BRIEF DESCRIPTION OF THE DRAWINGS

In order that the reader may gain a better understanding of the present invention, hereinafter will be described a preferred embodiment thereof, by way of example only, and with reference to the accompanying drawings in which:

FIG. 4 illustrates schematically a side or top loading waste compactor; and

FIG. 5 is a schematic side elevation of a modular waste collection container.

FULL DESCRIPTION OF THE EMBODIMENTS

Figure 1:
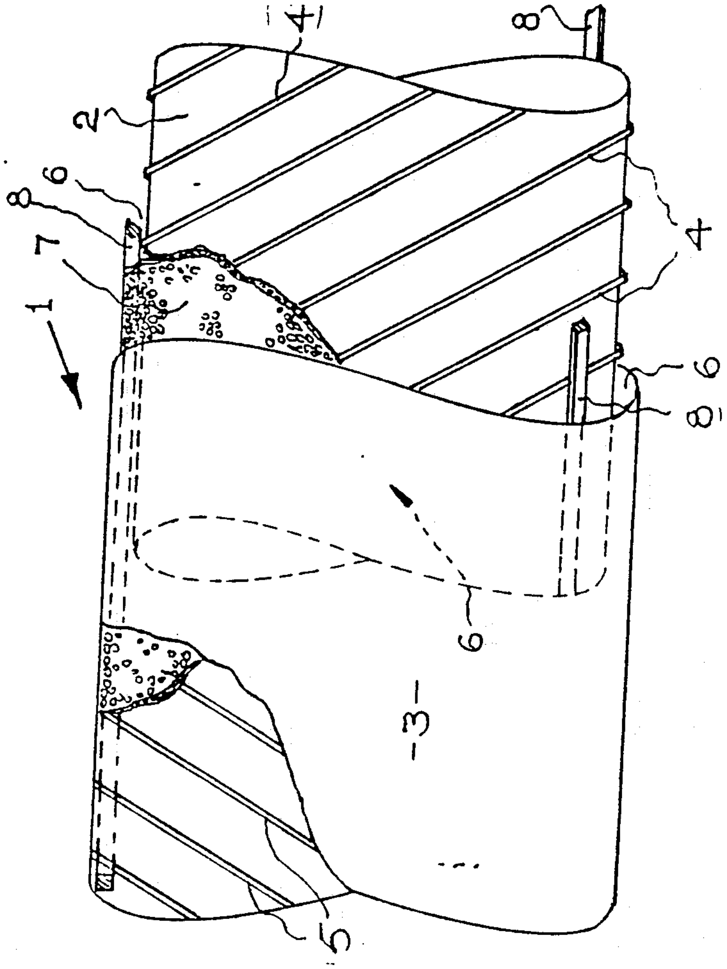
FIG. 1 illustrates a cylindrical form of monococque container according to the present invention, partly broken away to show its construction.

FIG. 1 shows the construction of the inventive cylindrical monococque container The term "monococque" container referring generally to a form of body construction (e.g. vehicular body construction) in which all or most of the stresses are carried by the skin or body of the container The container has a peripheral wall, (—constituting the outer shell or "skin" as defined above—) generally referenced 1, comprised of an inner wall 2 and an outer wall 3, concentrically disposed with respect to each other. Inner wall 2 is a tube of spirally-wound strip material, ideally of wear-resistant galvanised steel strip while outer wall 3 may well be of a weatherproof strip material such as aluminium/manganese alloy strip. Both inner and outer walls or tubes may be products of a spiral pipe-making machine producing a tight, overlapping rolled seam. A suitable machine for producing such tubes is that produced by Nokia Metal Products of Finland. This method of construction allows for flexibility and versatility in the choice of the material for the inner spirally wound tube, e.g., in the choice of material for their desirable properties, such as resistance to chemical corrosion, and the use of materials which are otherwise difficult to utilize (such as certain stainless steels, which have excellent corrosion resistance, but are difficult to weld).

The helical seam 4 of inner wall 2 is on the outside of it, while helical seam 5 of outer wall 3 is on the inside. Thus, both helical seams project inwardly toward an annular space, indicated at 6, defined between the inner and outer walls. It is advantageous to position the helical seams to "run" in opposite direction or senses, as is to be seen in FIG. 1. Annular space 6 is filled with a plastics material 7 of suitable density, and mechanical and chemical properties; ideally this may be a pressure-injected expandable-in-situ foam plastic material. Affixed to the outside of inner wall 2 is a plurality of longitudinally-directed spacing stringers 8 to enable the inner tube to be inserted into the outer one with constant concentric spacing between the two, so eliminating the need for a moulding jig, and facilitating the injection of the plastics material into the annular space between the inner and outer tubes. In addition, when the plastic is injected and foamed, the stringers serve to "key" the two tubes together.

Thus is formed a cylindrical monococque container of up to perhaps 2.6 meters in diameter in the case of mobile applications (larger diameters are possible for static and/or alternative applications), of a very low tare weight; moreover, the metal-to-foam-to-metal sandwich construction is eminently suitable to constitute the body of a waste compactor, as it is highly efficient in the suppression of noise engendered by the compaction of waste material. It also results in a radially and lonqitudinally stiff "cocoon" distributing evenly waste compaction forces at all points over the inner surface of inner wall 2.

In FIGS. 2 to 5 the monococque container of each embodiment is of the same construction as described with reference to FIG. 1, and will be referenced generally 1 in those FIGS.

Figure 3:
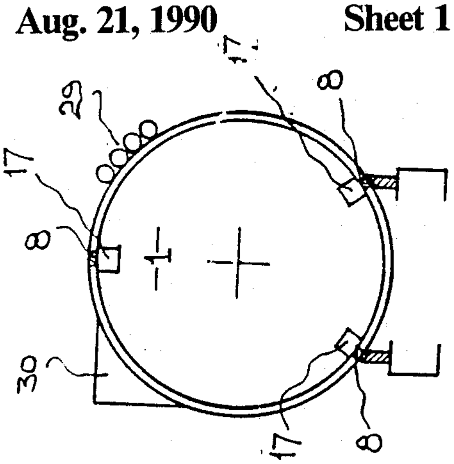
FIG. 3 is a corresponding schematic rear elevation.
Figure 2:
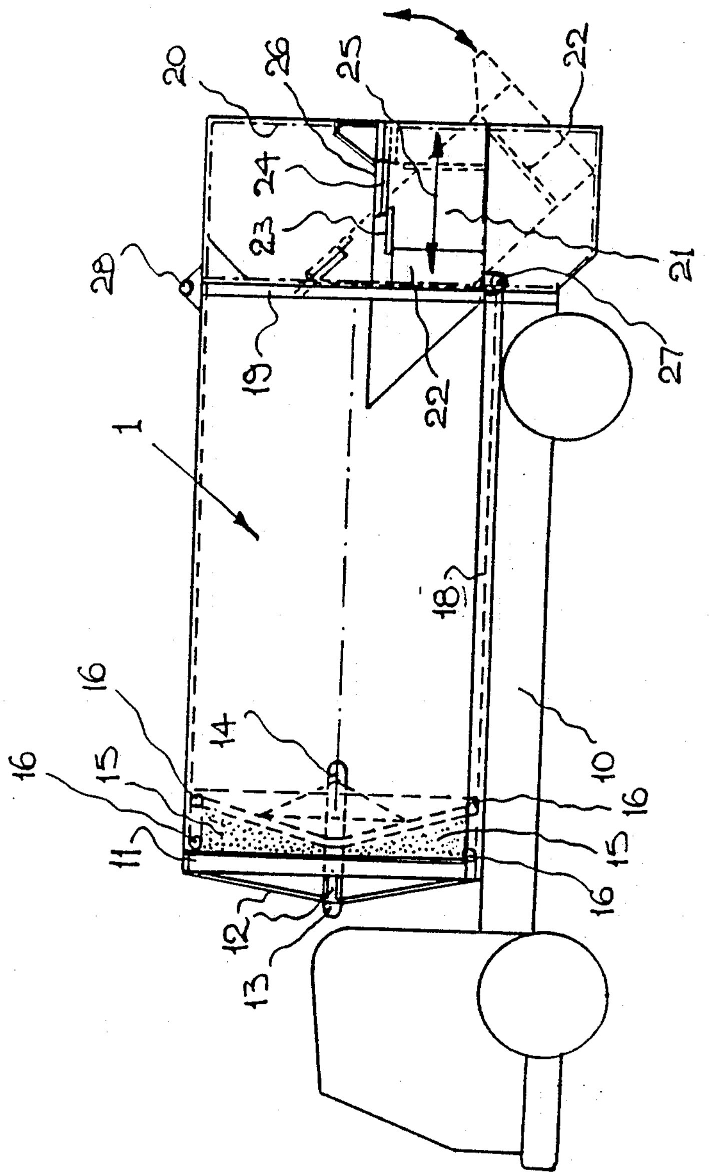
FIG. 2 is a schematic side elevation of a mobile waste compactor incorporating the present invention.

Referring now to FIGS. 2 and 3, on a conventional truck chassis 10 is mounted a waste collection monococque container, generally referenced 1. The forward end 11 of container 1 is suitably reinforced with a strip metal collar connected to a number of radially-oriented struts 12 centring on a tube 13 holding a front-end bearing for the ejector plate hydraulic cylinder 14. This conically-configured ring of struts 12 transfers the longitudinal forces created by ejector plate hydraulic cylinder 14 to the front of monococque container 1. The thereby resulting radial compression forces are carried by a planar set of radial struts inboard of strut ring 12, these planar struts being disposed within forward end collar 11 and centrally connected to the tube 13 holding the ejector plate cylinder bearing and cylinder 14.

The ejector plate per se includes a conical member 15, concentric with monococque container 1 and reinforced on its forward side (i.e., non-compacting side) by a tubular framework fitted with sheets 16 running on longitudinal rails 17 (see FIG. 3) attached to the interior surface of inner wall 2. These internal rails 17 are aligned with spacing stringers 8 and the lower two also with subframes 18 of truck chassis 10. The ejector plate further comprises an hydraulic telescoping ram or column to move the conical member fore and aft through the container.

After the fitting together of rails 17, spacing stringer 8 and subframes 18 to monococque container 1, the result is substantially a geodesic cylinder, being formed from a plurality of slightly concavely bent triangles created by the crossing helical seams, spacing stringers, internal rails and subframes. The end-product is an extremely light, wear- and weather-proof, rigid container body with quite substantial longitudinal stress capacity, making it eminently suitable for numerous storage and-/or transport applications, e.g. for the collection and transport of municipal waste, liquids, and powdery or particulate bulk materials.

A suitably contoured rear frame 19 mates with a compactor unit tailgate frame 20, with a gasket interposed there between. Tailgate frame 20 is of simple design and construction, and acts as a housing for a compactor unit, generally referenced 21, which feeds waste material into container 1. Compactor unit 21 is also of simple design and construction; briefly, a piston firstly compacts the waste against the retracting ejector plate 15, which provides a concommitant counter-pressure during its retracting movement, and then compacts 'fresh' waste against waste already compacted.

This bare principle has been employed in certain static waste compactors, usually sans ejector plate counter-pressure. However, the pistons of these static compactors are over-long and retract behind the hopper opening to avoid waste collected behind the piston from being moved in the wrong direction. Such a piston-hopper combination would result in a much too long rear overhang for a mobile rear-loading waste compactor.

In the compactor unit of the present invention, therefore, the piston has been kept as short as is possible by means of arranging it to move telescopically in three or more stages. Thus the piston is comprised of several telescoping 'boxes' and 'coverplates', the forward 'box' including a piston head 22, driven by hydraulic means, which pushes out, or pulls in, two or more guided, telescoping 'coverplates' 23, 24—as indicated by arrow 25. The thus-constituted 'box-shutter' prevents waste matter ending up on the wrong side of the piston head. The lower part of the hopper is fully open only when piston head 22 has been retracted into its rearmost position, so not permitting waste to enter the hopper in other than in front of the compacting piston.

The compacting piston may well be, say, 2 meters wide to permit a full width rear loading from standard 1.8 meters wide waste bins, and may be constructed of spirally-wound tube.

In order to better meet the requirements of low rear loading height, the compactor cover 26 with the associated compaction mechanism is arranged so as to hinge about a transverse axle or spindle 27 the height of which, above ground level, substantially equals that of the floor of container 1. This arrangement enables the compactor mechanism to be tilted within the tailgate/-compactor unit with it rear hopper end down, making manual loading of 45-liter waste bins more convenient and ergonometrically satisfactory. This lowered position of the compactor mechanism also facilitates power-assisted emptying of standard 1.8 meters wide large waste bins and the discharging of "MGB" bin carts with lower-level lifters (not shown) which can be fitted, if required, to the rear end of the compaction unit 21.

This lowered position is indicated in the drawing in dotted line, while high rear end position is shown in solid line, the latter configuration reduces the drop height of waste—e.g., from DIN "MGB" 240 liter bin carts, or the like, raised by bin lifters (not shown)—by 75% and accordingly reduces considerably the noise of waste falling into the hopper. To further reduce noise levels, the walls of tailgate frame 20 are insulated with such as a suitable plastic foam material.

As will be realised, it is most important that the telescoping 'boxes and coverplates' 23, 24, slide smoothly one within another, thus it is also important that they be made quite rigid and torque-resistant, since a slight degree of buckling will effectively jam movement of the compacting piston assembly. In order to prevent such buckling, thick metal sheet would seem to be an immediately obvious solution, however, such construction would be cumbersome and unacceptably heavy. So, it is envisaged that these telescoping 'boxes and coverplates' will be fabricated as laminated structures comprising a core of honeycomb carbon fibre clad with low-friction, wear resistant steel faces.

The tailgate frame/compaction unit 20, 21 is able to pivot upwardly, about transverse axle or spindle 28 so as to clear impedimentia 22, 20, 23, 24 and 26 out of the way, to thus enable garnered waste material in container 1 to be linearly discharged under the impetus of ejector plate 15.

In some embodiments, e g. for collection and transport of household waste, it is not necessary for the waste collection vehicle to include a separate compaction unit 21, since in the case of side- or front-loaders adequate compaction of such waste material can be achieved simply by use of the ejector plate 15, compacting the waste against the tail door.

It is contemplated that hydraulic lines may well be accommodated outside container 1, in the position referenced 29, and a hydraulic fluid tank at 30.

FIG. 4 schematically illustrates a top or side loading embodiment; in this drawing, components and/or integers equivalent to those depicted in FIGS. 2 and 3 are referenced by the same numeral. All these rear-loader embodiment components are quite easily re-arranged as shown.

In this arrangement, loading openings—as that referenced 31—at each side or on the top of container 1; there is a hinged door 32 in the ejector plate 15. Also on ejector plate 15 is a depending grille to prevent waste moving reverse towards the compactor. The monocoque container or collection body 1 has a reinforcing collar 33 at the rear end thereof, which carries a convex rear door 34 hinged at 28.

FIG. 5 shows, in schematic manner, another embodiment incorporating the inventive cylindrical monocoque container 1. Here again, the components and/or integers equivalent to those depicted in FIGS. 2, 3 and 4 are referenced by the same numeral.

FIG. 5 illustrates a static compactor embodiment in which an inventive container, generally referenced 1 accommodates those components referenced 12, 13, 14, 15, 16 and 18 as have been previously described with reference to FIGS. 1 to 4.

In this emboidment, container 1 is fitted with a sliding rear door 35; it is provided with a mechanism 36 adapted to lock container 1 to an existing or otherwise conventional static compactor device 37. Subframe 18 is provided with a standardised grip 38 for a truck-mounted loadchanger arrangement. The ejector plate hydraulics are readily connectable to a motor vehicle hydraulic system when container 1 is mobilised. Thus the invention provides for convenient modular and interchangeable container loads for vehicles e.g., to interchange a side or top loading waste compactor for a rear loading compactor.

It will be appreciated that the embodiment of FIG. 5 will permit the use of maximum length semi-trailers for the transport of such long containers; these are not tipped, but emptied by the ejector plate, thus it remains in the horizontal position at, say, a garbage dumping site.

Although the present invention as described above has been couched in terms of waste compactors and waste collection vehicles, the inventive monocoque containers are equally applicable to static waste compactors and, importantly, to bulk transport or storage containers for both fluid and particulate materials. In such applications, the monococque container 1, cut to a suitable length, is fitted on a subframe 18 and the-container ends, reinforced with collars, are fitted with convex dome end plates, which results in a lightweight, very strong and burst-resistant 'cocoon', suitable for carrying inflammable liquids by rail or road vehicles safer and more economically than in a conventional butt-joint welded, stiff single-skin steel or aluminium tank.

From the abovegoing, it will be readily appreciated by those skilled in the art that numerous variations and modifications may be made to the invention without departing from the spirit and scope thereof as set out in the following claims.

We claim:

1. A monococque structural container in geodesic composite construction comprising a peripheral wall having first and second ends, a first end member and a second end member located at and enclosing said first and second ends, respectively, of said peripheral wall;

said peripheral wall comprising an inner wall and an outer wall substantially concentrically disposed with respect to each other and separated by a plurality of circumferentially-spaced, longitudinally-directed stringer members disposed in an annular space defined between said inner and outer walls, said inner and outer walls being spirally-wound tubes formed from strip metal, adjacent edges of the strip metal overlapping so as to form resilient rolled helical seams disposed so as to project inwardly into said annular space, the direction of the helical seam of the inner wall running oppositely to the direction of the helical seam of the outer wall, and said annular space being filled with a plastics material;

characterized in that the combination of the opposed, rolled helical seams, the plastics material and said stringer members serve to provide a geodesic structure forming a grid of polygons to thereby distribute any impact and pressure loads throughout the container.

2. The monococque structural container as claimed in claim 1, wherein said inner wall is a tube of spirally-wound, wear-resistant steel strip material.

3. The monococque structural container as claimed in claim 1, wherein said outer wall is a tube of spirally-wound strip material manufactured from weather-proofed steel or aluminum alloy.

4. The monococque structural container as claimed in claim 1, further comprising a vehicle chassis, wherein said peripheral wall is mounted on said vehicle chassis and said container is capable of containing a fluid.

5. The monococque structural container as claimed in claim 1, further comprising a vehicle chassis, wherein said peripheral wall is mounted on said vehicle chassis and said container is capable of containing a particulate material.

6. A waste compaction vehicle having a longitudinal axis comprising a monococque structural container disposed substantially horizontally along the longitudinal axis of said vehicle, said container including a peripheral wall having first and second ends, a closed end wall, an openable end wall, a movable ejector plate located between said end walls, and a horizontally-extending piston located between said end walls for compaction of waste material contained therein against said ejector plate;

said closed end wall and said openable end wall being located at said first and second ends, respectively;

said peripheral wall comprising an inner wall and an outer wall substantially concentrically disposed with respect to each other and separated by a plurality of circumferentially-spaced, longitudinally-directed stringer members disposed in an annular space defined between said inner and outer walls, said inner and outer walls being spirally-wound tubes formed from strip metal, adjacent edges of the strip metal overlapping so as to form resilient rolled helical seams disposed so as to project inwardly into said annular space, the direction of the helical seam of the inner wall running oppositely to the direction of the helical seam of the outer wall, and said annular space being filled with a plastics material;

characterized in that the combination of the opposed, rolled helical seams, the plastics material and said stringer members serve to provide a geodesic structure forming a grid of polygons to thereby distribute any impact and pressure loads throughout the container.

7. The waste compaction vehicle as claimed in claim 6, wherein said inner wall is a tube of spirally-wound, wear-resistant steel strip material.

8. The waste compaction vehicle as claimed in claim 6, wherein said outer wall is a tube of spirally-wound strip material manufactured from weatherproofed steel or aluminum alloy.

9. The waste compaction vehicle as claimed in claim 6, wherein said piston comprises a piston head and a telescoping piston arm for advance and retreat of said piston head within said container and for compact containment thereof adjacent one of said end walls when said piston is not in use.

10. The waste compaction vehicle as claimed in claim 6, wherein said piston is slidably mounted on a plurality of guide rails which extend longitudinally along the inner wall of said container, said guide rails being aligned with the said stringer members.

11. The waste compaction vehicle as claimed in claim 6, further comprising separate compaction means mounted at the openable end of said container.

12. The waste compaction vehicle as claimed in claim 11, wherein said separate compaction means is pivotally mounted at said openable end of said container and is adjustable to variable load heights for the loading of waste material into said compaction means.

13. The waste compaction vehicle as claimed in claim 11, wherein said separate compaction means includes a second piston and cover means which are adapted to prevent waste material from entering in the rear of said second piston.

14. A waste compactor comprising a monococque structural container including a peripheral wall having first and second ends, an openable end member and an opposite closed end member located at said first and second ends, respectively, a static compaction means operatively coupled to said openable end member, a slidable ejector plate located between said ends, and means to slide said ejector plate;

said peripheral wall comprising an inner wall and an outer wall substantially concentrically disposed with respect to each other and separated by a plurality of circumferentially-spaced, longitudinally-directed stringer members disposed in an annular space defined between said inner and outer walls, said inner and outer walls being spirally-wound tubes formed from strip metal, adjacent edges of the strip metal overlapping so as to form resilient rolled helical seams disposed so as to project inwardly into said annular space, the direction of the helical seam of the inner wall running oppositely to the direction of the helical seam of the outer wall, and said annular space being filled with a plastics material, the combination of the opposed, rolled helical seams, the plastics material and said stringer members serving to provide a geodesic structure forming a grid of polygons to thereby distribute any impact and pressure loads throughout the container;

said static compaction means having an opening for receiving waste material for compaction and a piston for the compaction and ejection of said waste material against said ejector plate, said ejector plate being adapted to slidably recede into said container towards said closed end thereof as waste material is compacted in the container.

15. The waste compactor as claimed in claim 14, wherein said container further comprises a sub-frame for vehicle mounting when the container is uncoupled from said static compaction means for subsequent transport.

* * * * *